Patented June 15, 1926.

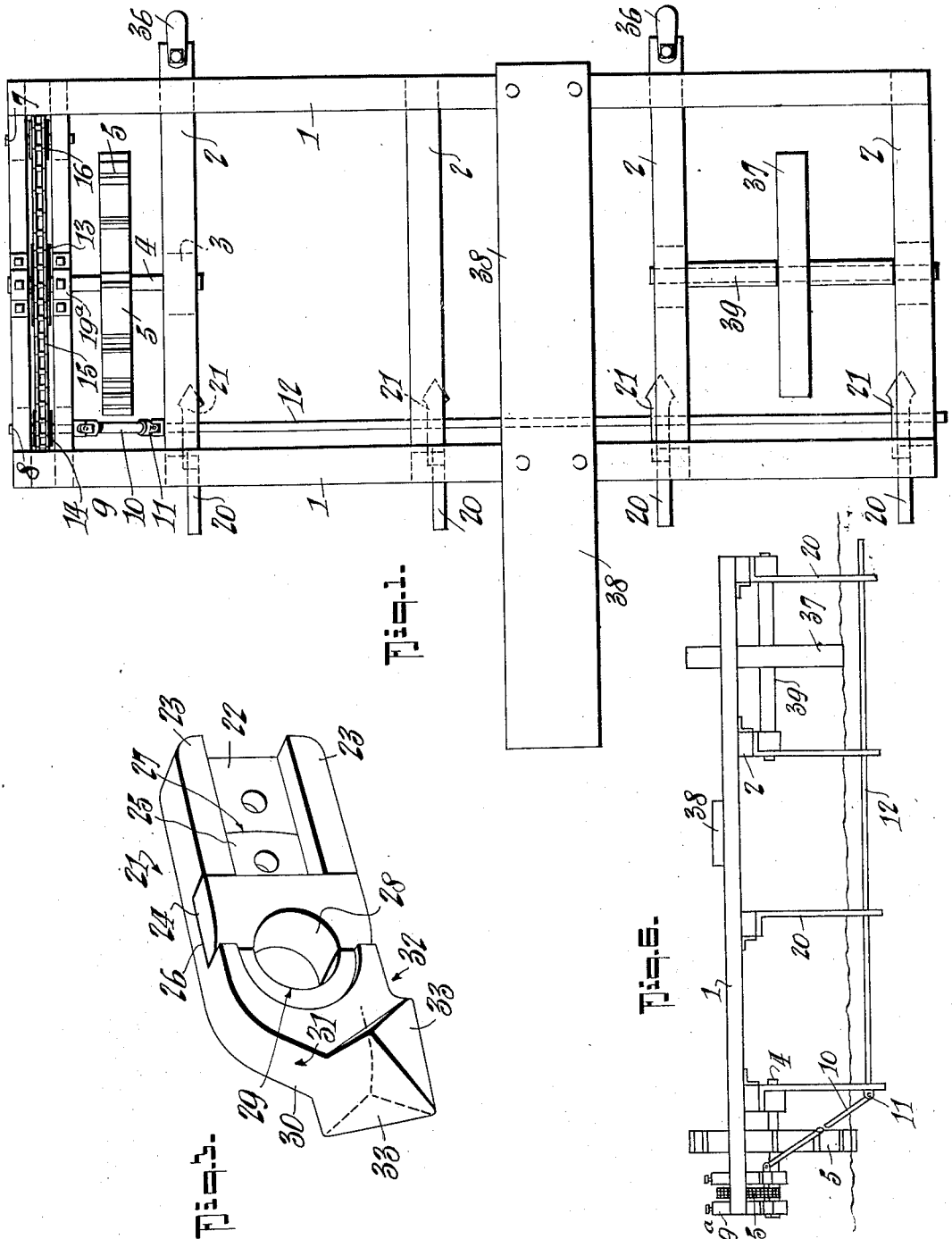

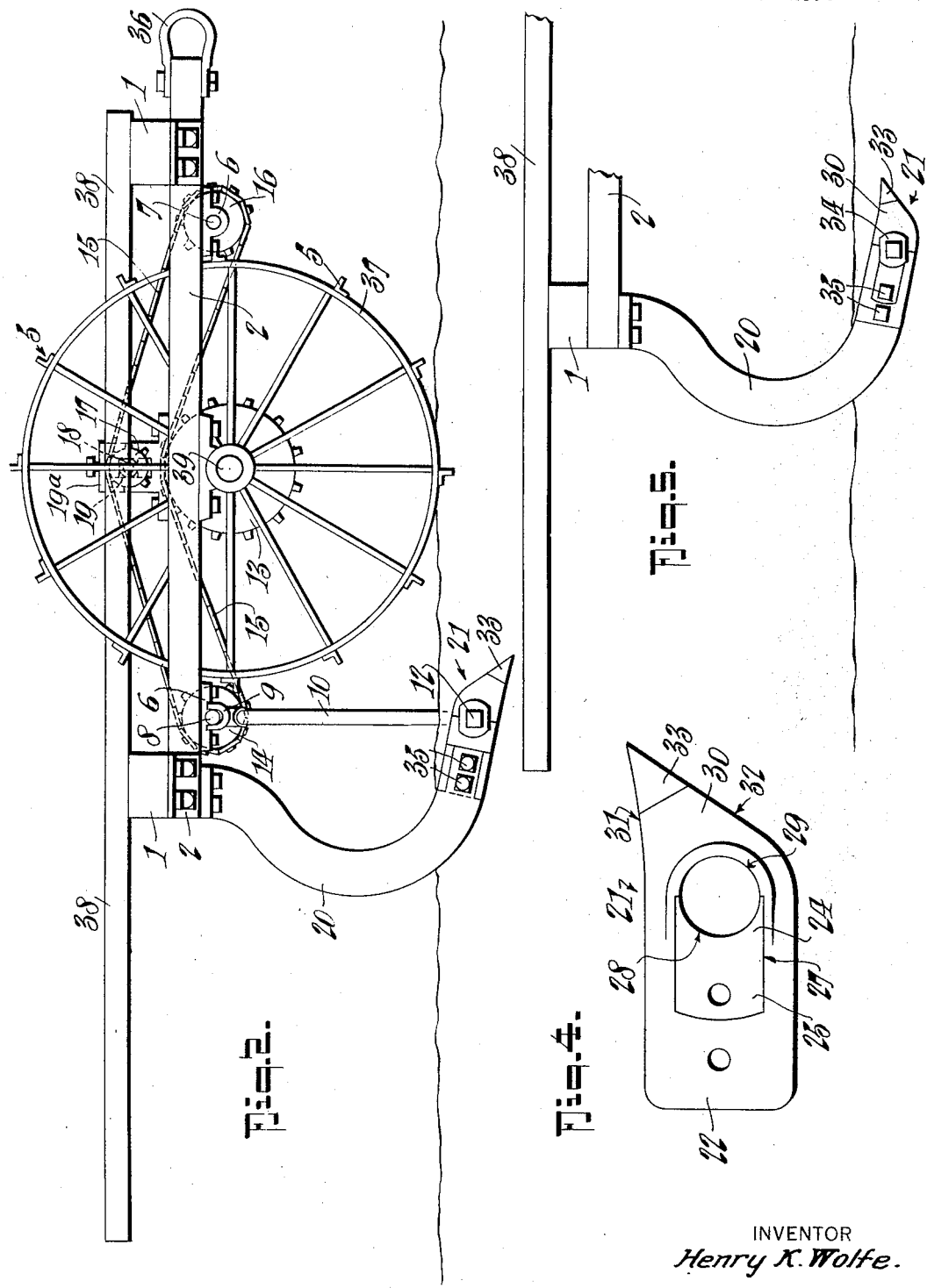

1,588,790

UNITED STATES PATENT OFFICE.

HENRY K. WOLFE, OF CHENEY, WASHINGTON, ASSIGNOR TO ROTARY ROD WEEDER & MFG. CO., OF CHENEY, WASHINGTON.

ROTARY-ROD WEEDER.

Application filed December 21, 1923. Serial No. 682,026.

The present invention relates to weeders of the rotary rod type and it especially has for its object to provide a weeder of the wheeled species of a compact design so that the distance between the supporting and driving wheels need not exceed the length of the rotary rod, thus reducing the side spread of the weeder over former weeders where the driving connection between the driving wheel and the rotary rod had to be located on the inner side of the driving wheel. In the present invention, the driving mechanism is located on the outer side of the driving wheel and the driving wheel and supporting wheel are located directly in front of the rotary rod and not spaced apart greater than the length of the rotary rod.

In its more detailed nature, the invention resides in those novel details of construction, combination and arrangement of parts, all of which will be first fully described, then be specifically pointed out in the appended claims, and illustrated in the accompanying drawing, in which:

Figure 1 is a plan view of a weeder embodying the invention.

Figure 2 is a side elevation of the same.

Figure 3 is a detail perspective view of the removable bearing member.

Figure 4 is a side view of the removable bearing member.

Figure 5 is a detail elevation of the gooseneck standard and removable bearing member adjusted for use in soft ground or sandy soil.

Figure 6 is a diagrammatic rear elevation of the invention.

In the drawing, in which like numerals of reference indicate like parts in all of the figures, the frame of the weeder is composed of transverse bars 1—1 connected by bars 2—2 and by the plank 38 on which the operator stands. 3 designates suitable bearings secured to certain of the cross bars 2 in which the drive shaft 4 of the driving wheel 5 is journalled and 6 designates other bearings in which the countershaft 8 and idler shaft 7 are respectively journalled, the shaft 8 being driven from the shaft 4 through sprockets 13—14 and chain 15 connections.

9, 10 and 11 indicate the power transmitting connection between the shaft 8 and the rotary rod 12. This may be the usual tumbler rod 10 having the universal joints 11 or any other suitable power transmitting connection may be employed.

The chain 15 takes over an idler roller 16 on the shaft 7 and over an idler sprocket or roller 17 with its shaft 18 adjustably mounted in the bearing support 19 so as to act as a chain tightener or take-up device.

The reference numeral 20 designates the standards which in the preferred embodiment of the invention are of the goose-neck type and they carry removable bearing members 21, the construction of which is best indicated in Figures 3 and 4 of the drawing. Each bearing member 21 comprises a shank 22 having flanges 23 adapted to fit on the ends of the goose-necks 20 and be secured thereto by suitable bolts and nuts 35. Each bearing includes a removable half bearing member 24 having a shank 25 to lie in the aperture 27 of the shank 22 flush with the same and through which one of the bolts 35 passes. The removable half bearing member 24 sets in the recess 26 of the main bearing member 22 and cooperates with the half bearing member 29 of the main bearing member. The half bearing face 28 of the member 24 matches the bearing face 29. The usual rod carrying bearing member 34 is employed to ride in a bearing surface 28—29.

The reference numeral 30 is the point of the shoe which in the present embodiment of the same is of the plow type, it having the plow point 33 formed at the juncture of the edges 32 and 31. It will be noticed that both edges 31—32 are directed in the same direction from the axis of the bearing, that is—they both extend forwardly and downwardly from the axis, the edge 31 being more nearly horizontal than the edge 32 so that when the parts are positioned as shown in Figure 2 the bearing member will be adapted for hard soil and by reason of its shape will tend to penetrate the ground as the weeder is pulled forward. When used in sandy or soft soil where the penetration of the rod in the ground is easy, the bearing is reversed, as shown in Figure 5 and then it has a tendency to ride up out of the ground, thus preventing the too deep penetration of the rotary rod into the ground.

The draft head clevises 36 are attached to the front of the weeder frame in any desired manner.

As shown in Figure 1, the supporting wheel 37 is mounted on the axle 39 that is journalled in bearings 40 on certain of the bars 2, the axle 39 aligning with the axle 4 of the wheel 5 in the preferred arrangement. It will also be noticed that the supporting wheel is located between a pair of goose-neck bearings 20 instead of to one side of the frame and the driving wheel 5 is located close up to the longitudinal beam 2 which carries the goose-neck 20 at one side of the machine while the power transmitting connections 13—14—15 lie outside of the wheel 5 or between it and the extreme end of the frame. In this way, the over-all width of the frame is greatly reduced from the present practice.

While I have shown and described a novel reversible rod bearing member in this application I desire it understood that the same, per se, forms no part of the present application.

From the foregoing description, taken in connection with the accompanying drawing, it is thought the complete construction, operation and advantages of my invention will be readily understood by those skilled in the art to which it appertains.

What I claim is:

1. In rotary rod weeders, a frame, rod carrying standards depending from the frame at intervals, a rotary rod journalled in bearings on said standards, a supporting wheel and a driving wheel mounted in said frame, the distance between said wheels being less than the length of said rotary rod, a power transmitting mechanism mounted on said frame on the outer side of said driving wheel and connected therewith and including a driving connection with said rotary rod.

2. In rotary rod weeders, a rectangular frame having end longitudinal beams, intermediate longitudinal beams and front and back cross beams, a supporting wheel and a driving wheel journalled in bearings in said frame, standards carried by said frame at intervals across it, rod bearings on said standards, a rotary rod journalled in said bearings and of greater length than the distance between said wheels, a countershaft journalled in bearings in said frame and located at the outer side of said driving wheel, power transmitting connections between said driving wheel and said countershaft, and power transmitting connections between said countershaft and said rotating rod.

3. In rotary rod weeders, a rectangular frame having end longitudinal beams, intermediate longitudinal beams and front and back cross beams, a supporting wheel and a driving wheel journalled in bearings in said frame, standards carried by said frame at intervals across it, rod bearings on said standards, a rotary rod journalled in said bearings and of greater length than the distance between said wheels, a countershaft journalled in bearings in said frame and located at the outer side of said driving wheel, power transmitting connections between said driving wheel and said countershaft, power transmitting connections between said countershaft and said rotating rod, said standards comprising goose-necks mounted on the frame to the rear of said wheels, and a plank mounted on said frame and projecting to the rear thereof for the operator to stand on and shift the center of gravity of the weeder.

4. In rotary rod weeders, a rectangular frame having end longitudinal beams, intermediate longitudinal beams and front and back cross beams, a supporting wheel and a driving wheel journalled in bearings in said frame, standards carried by said frame at intervals across it, rod bearings on said standards, a rotary rod journalled in said bearings and of greater length than the distance between said walls, a countershaft journalled in bearings in said frame and located at the outer side of said driving wheel, power transmitting connections between said driving wheel and said countershaft, power transmitting connections between said countershaft and said rotating rod, said supporting wheel being located in front of and between one pair of standards at one side of the machine and said driving wheel being mounted in front of the standard at the other side of the machine and to one side thereof.

5. In rotary rod weeders, a frame, rod carrying standards depending from the frame, a rotary rod journalled in bearings on said standards, a supporting wheel and a bearing wheel mounted in said frame in advance of said rod, said rotary rod being of greater length than the distance between said driving wheels, reduction gearings mounted on said frame to the outside of the driving wheel and operatively connected with the same and with the adjacent end of the rotary rod for the purposes described.

HENRY K. WOLFE.